United States Patent [19]

Stahl

[11] Patent Number: 4,517,092

[45] Date of Patent: May 14, 1985

[54] DECANTER-TYPE SEPARATING APPARATUS

[76] Inventor: Werner Stahl, Stalbuehlweg 8, D-6740 Landau, Fed. Rep. of Germany

[21] Appl. No.: 423,746

[22] Filed: Sep. 27, 1982

[30] Foreign Application Priority Data

Oct. 2, 1981 [DE] Fed. Rep. of Germany ....... 3139345

[51] Int. Cl.[3] ............................................. B01D 21/26

[52] U.S. Cl. ................................. 210/512.1; 210/523; 494/53

[58] Field of Search ............ 210/788, 784, 337, 512.1, 210/523; 494/56, 43, 60, 53, 54, 52; 209/459

[56] References Cited

U.S. PATENT DOCUMENTS

| | | | |
|---|---|---|---|
| 3,674,206 | 7/1972 | Wendt, Jr. | 494/56 |
| 4,277,330 | 7/1981 | Wright et al. | 209/459 |
| 4,324,334 | 4/1982 | Wright et al. | 209/459 |

FOREIGN PATENT DOCUMENTS

| | | | |
|---|---|---|---|
| 787190 | 6/1968 | Canada | 210/377 |
| 1532683 | 2/1971 | Fed. Rep. of Germany | 233/34 |

*Primary Examiner*—Peter Hruskoci

*Attorney, Agent, or Firm*—Fleit, Jacobson, Cohn & Price

[57] ABSTRACT

Decanter-type separating apparatus comprising within a rotatably mounted tapered and cylindrical barrel a solids-transporting screw rotating at a speed different from the barrel speed, the aforesaid apparatus being characterized by the screw having in an intensive clarification region a pitch substantially greater than used in the past, to stabilize the flow as far as possible and to obtain particularly effective and efficient clarification. In the intensive clarification region, the pitch is much greater than ten degrees and preferrably is within a range of forty to fifty degrees, in certain cases on the order of up to sixty degrees.

7 Claims, 1 Drawing Figure

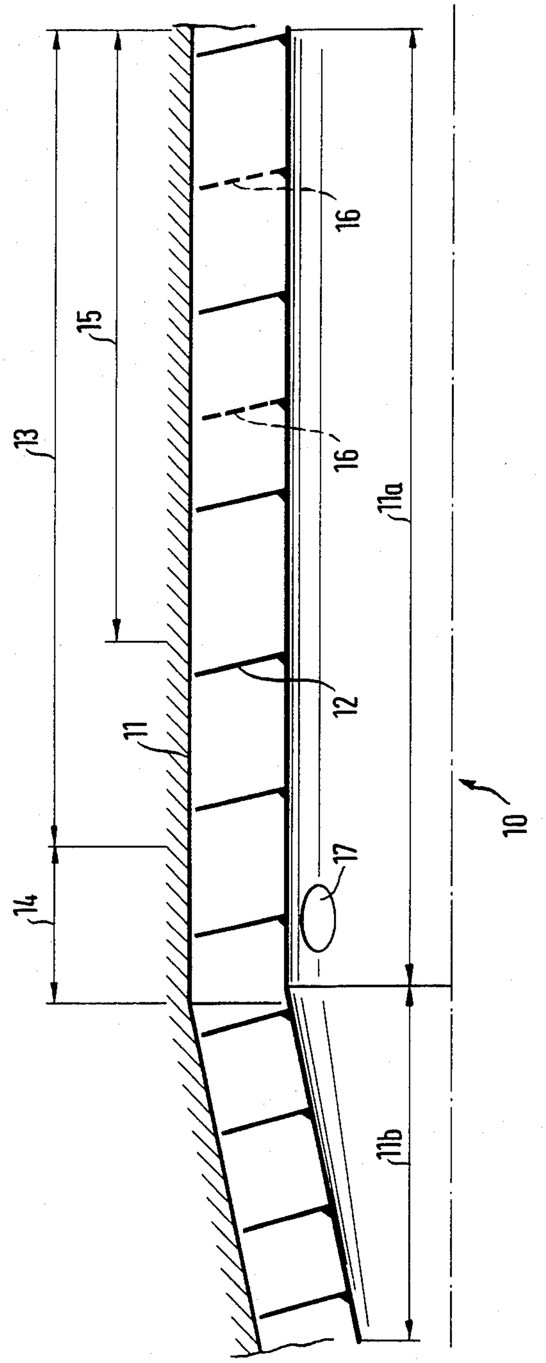
13
15
16'
16'
11a
12
11
10
17
14
11b

DECANTER-TYPE SEPARATING APPARATUS

BACKGROUND OF THE INVENTION

The invention relates to a decanter-type separating apparatus comprising a rotatably mounted conico-cylindrical barrel and a screw-type rotor rotating and transporting solids inside said barrel at a speed differing from the speed of barrel rotation.

This type of decanting apparatus, which is referred to in the art as decanter centrifuge or, briefly, as a decanter, is commonly known and in most instances operates according to the countercurrent principle.

A particular design problem of decanter apparatus is the structure of the solids transporting screw. The geometry of the screw must be such that the solids may be discharged reliably from the tapered barrel section without sliding back into or having rotation imparted thereto by the barrel, instead of being discharged continuously.

It has been known from practical experience that the problems of solids transport and discharge increase with the taper of the barrel.

Also, it has been known that solids transport will improve with smaller pitches of the screw or flights on the rotor.

As a matter of experience, a taper of about eight to ten degrees has been found to be satisfactory.

Also, for the pitch of the screw, relative to the radius of the cylinder, a value within the range of six to eight degrees has been found to represent a suitable compromise between the various constructional and process requirements.

Major problems frequently arise in the area between the tapered and the cylindrical barrel sections. In that area, solids settle to form a cake having a substantially solid consistency in the cylindrical section. The solids cake has to be broken up when passing the joint between the cylindrical and the tapered sections and has to be given a new form adapted to the taper. Also, and particularly when treating paste-like products, solids may happen to accumulate in the tapered section and far back into the cylindrical section, although a pushing effect produced by the rotor will ultimately succeed in conveying the solids way up into the tapered barrel section. For the reasons briefly explained above, an effect may occur in the transition area from the cylindrical to the tapered barrel sections and, frequently, within the cylindrical barrel section itself which may be referred to as a "circulating solids transport", with the solids revolving with the barrel. This phenomenon of course greatly interferes with proper solids discharge and may disrupt it completely.

As it had turned out in the course of time that pitch angles up to about eight degrees in the tapered barrel section produce useful results, the conclusion was drawn that corresponding pitch angles are equally suitable for the cylindrical section of the barrel.

In general, those skilled in the art accepted this conclusion for a useful solution because there is a variety of reasons for which experiments involving full-size screw-type rotors are not feasible—particularly because of the exceedingly high fabrication costs of a screw, as manufacture of a useful screw-type rotor constitutes a major engineering and production problem and thus is quite expensive.

Of course, in many instances, the performance of known decanter-type separation apparatus was found not be satisfactory, and attempts have been made to find ways and means to improve on the clarification of the liquid.

Good clarification requires a substantial dwell time of the suspension on the rotor of a decanter. Also, the design must be such that disturbances are prevented in the flow of the liquid running off the flights.

As a result, the conditions to be fulfilled are a small differential speed between the screw and the barrel, slopes as smooth as possible of the flights, precise and uniform planar slopes of the screw even where the helix is assembled of sections welded together, and similar production requirements.

Of particular importance for stabilizing flow is a low backflow velocity. For a given liquid throughput, it would appear reasonable to select screw ducts as broad as possible, which would be theoretically feasible by increasing the pitch. Those attempts would be inconsistent with experience, however, and with the well-founded fear that it would not be possible any more to properly conduct the solids transport.

For this reason, those skilled in the art abstained from using greater screw pitches than about six to eight degrees. Instead, attempts were made to enhance clarification by improving flow conditions by other means.

In order to avoid flow disturbances caused by the screw, a short-circuit path or bypass was offered to the centrate, i.e. the centrate did not have to flow to the screw ducts any more.

Also attempts at obtaining improved results were made by using a so-called immersed screw rotor. The basic idea underlying the immersed screw rotor is to have the liquid or at least a portion thereof run to the overflow on a short-circuit or bypass path in a strongly perforated rotor body in order to limit flow and sedimentation disturbances to the screw space and to prevent them from affecting the stabilized zone in the rotor cavity. A large rotor body was used, as were narrow flights, and the centrate was allowed to flow to the overflow edge through perforations in the rotor body itself. The disadvantage of this approach, as it turned out to be, was that when filling the rotor during start-up, sedimented solids would drop into the rotor cavity and form localized deposits. When re-starting the rotor, those localized deposits would unbalance the decanter and force the apparatus to be disassembled and the rotor to be removed for cleaning.

Another attempt was to improve a ribbon-type screw design by axially guiding the liquid between the ribbon and the rotor body by means of ledges, ridges or similar channel-forming elements.

These additions presented complications in design and manufacture as well as difficulties to the servicing and maintenance effort. As a consequence, they never gained much practical significance.

SUMMARY OF THE INVENTION

All prior attempts to solve the problems arising from flow disturbances have been unsuccessful.

Thus it is the object underlying the invention to teach decanter-type separating apparatus of the type specified above which enables particularly good clarification to be obtained while at the same time providing for continuous and undisturbed solids transport.

To achieve this object, there is provided in accordance with the invention an intensive clarification region extending long at least part of the cylindrical barrel section, and the pitch of the screw within the intensive clarification region is made to be substantially greater than ten degrees.

The invention involves use of—despite long years of experience and apprehension to the contrary among those skilled in the art—a pitch of the screw which is far greater than the values commonly employed in the past as considered feasible.

The use of the invention enables a particular advantage to be gained in that the clarification of the liquid is surprisingly good. For, the use of the invention makes possible to avoid disturbances in the flow of the liquid running off the flights.

Besides, the detrimental backflow velocity has turned out to be particularly low in the inventive design. In accordance with an advantageous further development of the inventive decanter-type separating apparatus, the pitch of the screw may be about fifteen to sixty degrees in the intensive clarification region. Preferrably, the arrangement is such that a transition region is formed between that part of the screw where the pitch is conventional, and the aforesaid intensive clarification region, with the pitch of the screw increasing gradually and continuously through the transition region.

It has turned out to be of particular advantage if the transition region extends for about 360°.

According to another advantageous further development of the invention, the aforesaid transition region is made to lie in the area joining the tapered to the cylindrical barrel section.

Also, according to a particularly effective further development of the inventive subject matter, the screw pitch in the intensive clarification region increases with distance from the tapered section, causing a diffuser section to be formed. In the diffuser section, preferrably, flow-guiding elements or baffles may be provided between the flights.

By way of the aforesaid elements or baffles, the flow in the divergent flow passage advantageously is maintained on the wall surfaces defining the passage.

The invention is based on the insight that it is possible to reconcile seemingly contradictory requirements, namely, on the one hand to reliably and continously transport and discharge the solids while on the other hand obtaining a flow as stable as possible.

Therefore, in accordance with the idea underlying the invention, a low pitch of the srew is maintained in the tapered barrel section and preferrably in part of the cylindrical barrel section as well. Thereafter, in accordance with the invention, it is possible after a preferably gradual and continuous transition, to use an unusually great pitch, resulting in a substantially reduced flow rate and thus, in a surprisingly undisturbed, efficient and effective clarification.

Where in the instant application reference is made to a pitch of the screw "substantially greater" than in conventional designs, it is meant that improved results will be obtained with designs already in which the pitch exceeds ten degrees to only a relatively small extent. In that case, the potential of the invention will not be exhausted, of course, as the invention utilizes the insight that the screw pitch may be increased considerably and extraordinarily over known arrangements; pitch angles in the area of forth to fifty degrees and even on the order of sixty degrees, in certain cases, are perfectly possible.

Ultimately, an upper limit is set by the necessity to be able to discharge sedimented fines from the "end" of the barrel.

Within the scope of the instant invention, the potential upper limit of screw pitch depends greatly on the roughness of the flights; also, there exists of course a dependence on the properties of the product under treatment and on the wear conditions of the flights. In general, it may be stated that the upper limit attainable within the scope of the subject invention depends largely on the condition of the flight surfaces.

For determining precisely the upper limit of the screw pitch range, another proces aspect is significant: The relative speed between the screw on the one hand and the barrel on the other causes a roll-type flow to be excited in the screw duct. The liquid will ascend on the leading edge of a flight, flow back across the surface of the screw duct, and then descend to the bottom of the recess between the flights at the trailing end thereof. This flow disturbance will augmented by the screw pitch so that the process effect described above allows important criteria to be derived for the upper limit of the useful pitch range.

BRIEF DESCRIPTION OF THE DRAWING

In order that the subject invention may be understood in depth, it will now be described hereinbelow under reference to the annexed drawing, of which the only Figure shows in a purely schematic way a view of the decanter apparatus in section.

DETAILED DESCRIPTION OF THE DRAWING

The drawing does not show (at 10) the decanter-type apparatus completely; instead, the drawing only represents those components thereof which are important for understanding the inventive principle.

A transport screw 12 is disposed inside a barrel 11 having a cylindrical section 11*a* and a conical or tapered section 11*b*. The drawing shows barrel 11 and screw 12 in section in a schematical way.

Within the intensive clarification region 13 provided in accordance with the invention, the flights of the screw are shown at relatively great distances in comparison with a transition region 14 and, particularly, tapered section 11*b* of barrel 11. As shown, the flights are not at equal distances within the intensive clarification region 13; rather, the distances between them increase to the right-hand side of the drawing.

Within transition region 14, the pitch of the screw increases gradually and continuously so that screw 12 has throughout intensive clarification region 13, which in the drawing occupies a major portion of the cylindrical barrel section, a pitch substantially greater than in tapered barrel section 11*b*.

In a diffuser section 15, the pitch increases continuously so that a divergent flow duct is formed in diffuser section 15.

In diffuser section 15, flow-guiding elements or baffles 16 are provided, as shown schematically, to maintain the flow on the walls of the flow duct.

Merely for completeness, the drawing shows the material input zone schematically at 17.

Within the purview of the invention, transition region 14 may be shifted from the joint between the tapered and cylindrical sections of barrel 11 into the cylindrical barrel section. Also, the configuration of the transition region and its extent may be modified without departing from the invention. In particular, the transition region may extend for more or less than 360°.

As a matter of principle, the invention shall be deemed to embrace each and any arrangement in which the screw has within the cylndrical barrel section and in an intensive clarification region therewith a pitch substantially greater than in conventional designs, where the pitch is smaller than ten degrees.

I claim:

1. A decanter-type separating apparatus for separating a solids-liquid suspension into solids and liquid, said apparatus comprising:

a conico-cylindrical barrel having a tapered section adjacent to a cylindrical barrel section said conico-cylindrical barrel rotatable at a first speed;

a solids-transporting screw rotatable at a second speed, said screw rotatable in said barrel and extending throughout said tapered and cylindrical sections of said barrel;

an intensive clarification region extending along at least part of said cylindrical barrel section;

a first pitch of said screw being greater than ten degrees in said intensive clarification region, the pith of said screw increasing in said intensive clarification region in the longitudinal direction away from said tapered section;

inlet means lying in said cylindrical section adjacent to said tapered section for introducing the solids-liquid suspension into said conico-cylindrical barrel;

first outlet means included in said tapered section for removing the solids from said tapered section; and second outlet means included in said cylindrical section for removing the liquid from said cylindrical section.

2. The apparatus as claimed in claim 1, wherein said first pitch is in the range between fifteen degrees and sixty degrees.

3. The apparatus as claimed in claim 2, further comprising a transition region of said barrel formed between a region of said barrel with a second pitch of said screw less than ten degrees and said intensive clarification region, said first pitch increasing gradually and continuously in said transition region.

4. The apparatus as claimed in claim 3, wherein said transition region extends approximately 360° along said screw.

5. The apparatus as claimed in claim 3, further comprising a plurality of baffles defined on said solids-transporting screw between flights of said screw, said baffles being confined within said intensive clarification region of said barrel.

6. The apparatus as claimed in claim 1, wherein said first pitch is between forty and fifty degrees.

7. The apparatus as claimed in claim 1, wherein said first pitch is sixty degrees.

* * * * *